United States Patent [19]

Trickle

[11] Patent Number: 4,865,507
[45] Date of Patent: Sep. 12, 1989

[54] DOCK LEVELER ASSEMBLY AND LATCH MECHANISM THEREFOR

[75] Inventor: Glen Trickle, Racine, Wis.

[73] Assignee: Rite-Hite Corporation, Milwaukee, Wis.

[21] Appl. No.: 190,593

[22] Filed: May 5, 1988

[51] Int. Cl.$^4$ ................................................ E01D 1/00
[52] U.S. Cl. ..................... 414/401; 14/71.1; 414/584; 414/537
[58] Field of Search ............... 414/401, 397, 400, 537, 414/396, 587; 105/436; 14/69.5, 71.1

[56] References Cited

U.S. PATENT DOCUMENTS

| | | | |
|---|---|---|---|
| 4,325,155 | 4/1982 | Alten | 14/71.1 |
| 4,665,579 | 5/1987 | Bennett et al. | 14/71.1 |

FOREIGN PATENT DOCUMENTS

| | | | |
|---|---|---|---|
| 1340868 | 12/1973 | United Kingdom | 414/401 |
| 2067504 | 6/1981 | United Kingdom | 14/71.1 |

Primary Examiner—Robert J. Spar
Assistant Examiner—Robert S. Katz
Attorney, Agent, or Firm—Neuman, Williams, Anderson & Olson

[57] ABSTRACT

A dock leveler assembly and latch mechanism therefor are provided which are adapted to automatically cause unlatching of components thereof if the assembly is activated without a vehicle being present or if the vehicle moves away from a dock; thus enabling the assembly to readily return to an inoperative mode position.

17 Claims, 4 Drawing Sheets

DOCK LEVELER ASSEMBLY AND LATCH MECHANISM THEREFOR

BACKGROUND OF THE INVENTION

Heretofore with prior dock leveler assemblies of various types a serious safety hazard was created when the dock leveler was activated without a vehicle in position or when the vehicle moved away from a dock after completion of the loading or unloading operation, because the lip section of the assembly remained in an extended outwardly projecting latched position with respect to the platform section. In such a situation, if the dock operator failed to take the necessary action to return the lip section to its inoperative mode, the extended outwardly projecting lip section was very susceptible to being struck or damaged by the next truck when backing towards the dock for loading or unloading. Furthermore, injury to the dock personnel could likely occur if such personnel should inadvertently walk onto the unsupported, extended lip section causing the lip and platform sections to suddenly and abruptly pivot downwardly and the personnel to fall to the ground. Thus, to avoid such a situation, it required a conscious action on the part of the dock personnel as well as alertness on the part of the vehicle driver.

SUMMARY OF THE INVENTION

Thus, it is an object of the invention to provide an improved dock leveler assembly which does not rely on a conscious act on the part of one or more dock personnel to cause the unit to assume an inoperative mode.

It is a further object to provide an improved dock leveler assembly which is of simple, sturdy and compact construction and is easy and inexpensive to install and maintain.

It is a still further object to provide an improved dock leveler assembly wherein various components thereof may be readily installed on existing dock leveler assemblies without requiring significant and costly modifications being made to such existing structures.

Further and additional objects will appear from the description, accompanying drawings and appended claims.

In accordance with on embodiment of the invention an improved dock leveler assembly is provided which includes a frame section affixed to the upright front wall of a dock. The frame section is positioned so that an upper edge thereof is adjacent the horizontal loading surface of the dock. The frame section is provided with a fixedly mounted release means which is disposed a predetermined distance outwardly from the dock front wall and below the plane of the dock loading surface. Hingedly connected to the upper edge of the frame section is a platform section having a traffic surface and a non-traffic surface. Mounted on the non-traffic surface of the platform section is a first latch means which is spaced from the frame section. Hingedly mounted on the platform section and disposed opposite the hinge connection between the frame and platform sections is a lip section having a traffic surface and a non-traffic surface. Mounted on the non-traffic surface of the lip section is a complemental second latch means. The first and second latch means are adapted to engage one another and latch the lip section in an extended position relative to the platform section whereby the latched sections will pivot as a unit about the frame section upper edge as an axis through a given sector until the lip section engages the bed of a vehicle parked adjacent the unit whereupon the platform and lip sections become unlatched. Upon the vehicle moving away from the dock front wall, the extended lip section becomes disengaged from the vehicle bed, causing the unlatched platform and lip sections to pivot downwardly and assume an inoperative mode position. If no vehicle is parked at the dock front wall when the latched platform and lip sections pivot as a unit, they will pivot beyond the given sector causing one of the latch means to engage and be moved by the release means thereby automatically unlatching the platform and lip sections and allowing same to assume an inoperative mode position.

DESCRIPTION

For a more complete understanding of the invention reference is made to the drawings herein.

Figure 1:
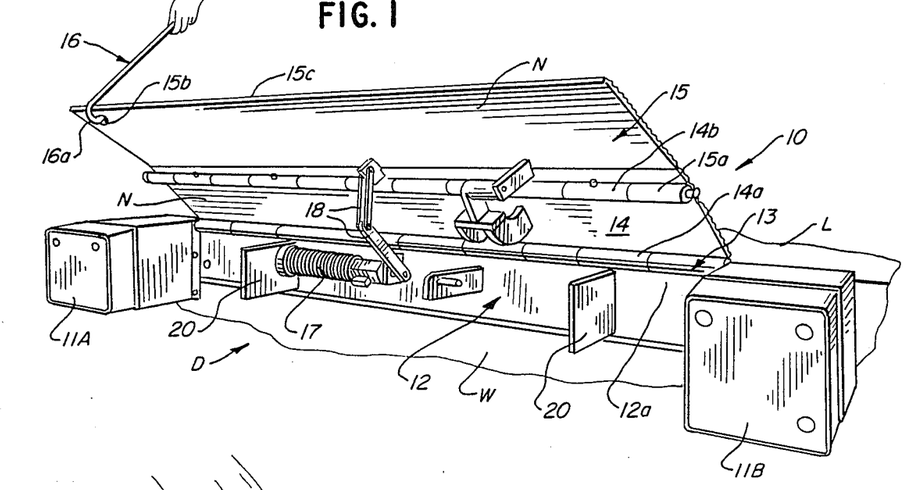
FIG. 1 is a fragmentary perspective view of a mechanical version of an improved edge of dock leveler assembly embodying the invention hereinafter described and showing the lip and platform sections thereof being manually lowered to assume an operative mode position.
Figure 3:
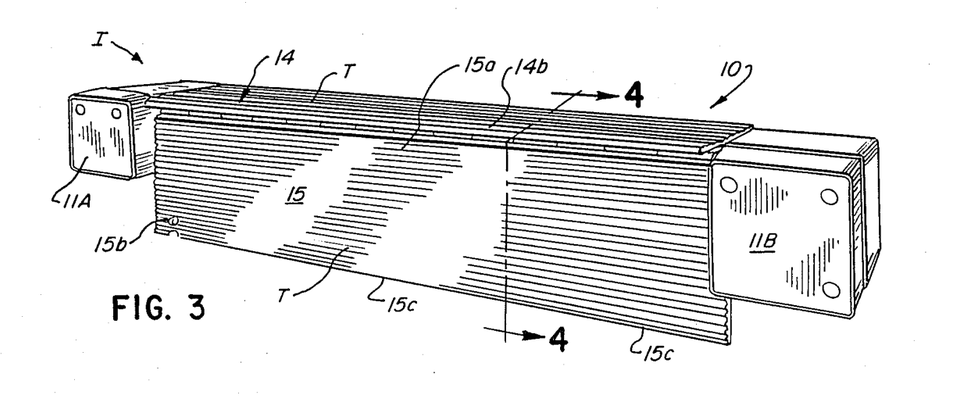
FIG. 3 is similar to FIG. 1 but showing the assembly in an inoperative mode position.

Referring now to the drawings and more particularly to FIGS. 1 and 3 one embodiment of an improved dock leveler assembly 10 (e.g. an edge of dock leveler unit) is shown. The assembly 10, sometimes referred hereafter as a unit, is mounted on the upright front wall W of a loading dock D and is adapted to span the distance between the dock front wall and the rear end of a bed B of a vehicle V when the latter is parked at the dock for loading and unloading. When the vehicle is properly parked at the dock, the rear end of the bed B will engage a pair of conventional bumpers 11A and 11B which are disposed on opposite sides of the unit 10 and prevent the dock front wall and the unit 10 from being damaged by the rear end of the bed B. The bed B is retained in abutting relation with the bumpers 11A, 11B by a mechanical, electro-mechanical or hydraulically actuated vehicle restraint, not shown, engaging a depending ICC bar affixed to the underside of the bed, or by conventional wheel chocks, not shown, wedged against the front of the vehicle rear wheels.

Unit 10 includes a plate-like frame section 12 which is fixedly mounted (e.g. by anchor bolts or welding) on the dock front wall W. The upper edge 12a of section 12 is shaped to form one segment of a hinge 13 and is disposed adjacent the loading surface L of the dock so that the hinge axis is substantially within the plane of the surface L. The loading surface L is normally horizontal and extends inwardly from the dock front wall to a door, not shown, leading to the interior of a plant or warehouse facility.

Hingedly connected to the frame section upper edge 12a is a plate-like platform section 14. One edge 14a of section 14 is shaped to interfit with the hinge segments provided on the edge 12a of the frame section. The opposite edge 14b of section 14 is hingedly connected to an edge 15a of a plate-like lip section 15. The sections 12, 14 and 15 have relatively narrow, generally rectangular configurations and the platform and lip sections each has a traffic surface T and a non-traffic surface N.

Figure 4:
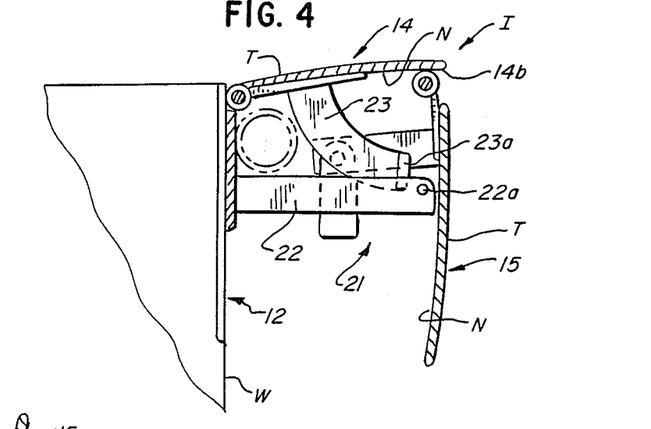
FIGS. 4, 4A and 4B are fragmentary sectional views taken along line 4—4 of FIG. 3 and showing the assembly, respectively, in an inoperative mode, an intermediate mode and an operative mode position.

The platform and lip sections 14 and 15 are adapted to normally assume an inoperative mode I, see FIGS. 3 and 4, wherein the platform section 14 is substantially coplanar with the dock loading surface L and the lip section 15 depends at a substantially right angle from the edge 14b of the platform section. When in the dependent position, the lip section is recessed inwardly from a plane defined by the outer faces of the bumpers 11A, 11B and thus, contact between the rear end of the vehicle bed and the dependent lip section 15 is avoided thereby preventing damage to the unit 10, the dock wall W and/or the vehicle.

Figures 4A, 4C:
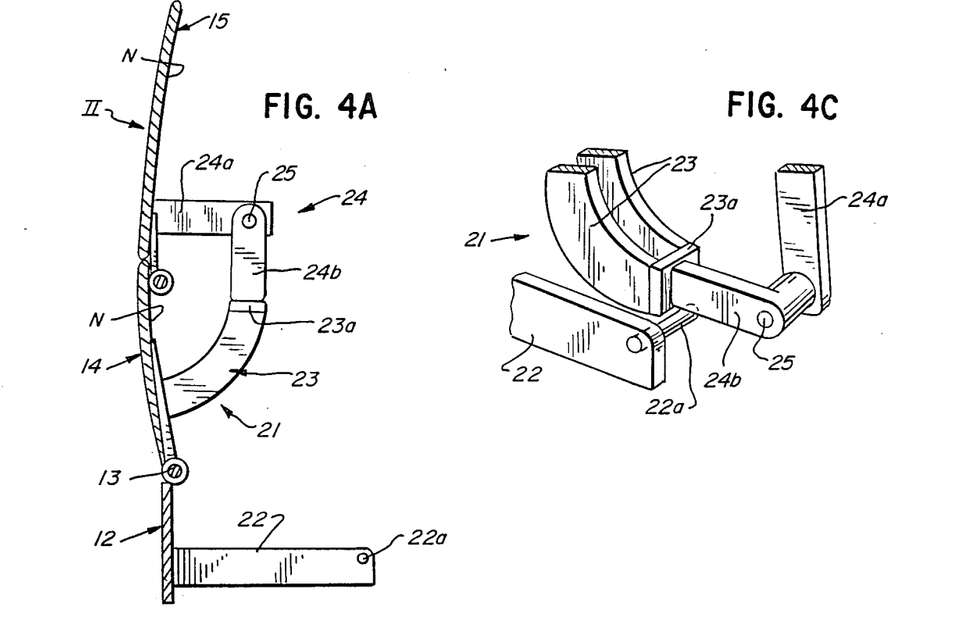
FIG. 4C is an enlarged fragmentary perspective view of the latch mechanism shown in FIG. 4B.
Figures 5, 6, 6A, 7:
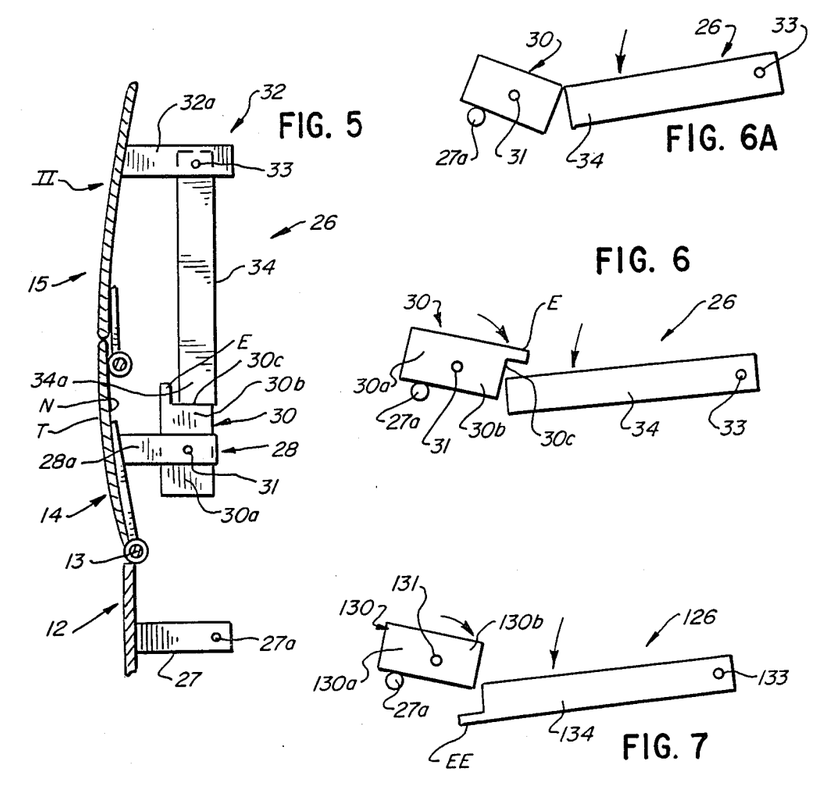
FIGS. 5 and 5A are fragmentary sectional views similar to FIGS. 4A and 4B but of a first modified version of the improved assembly.
FIG. 6 is an enlarged fragmentary side view of the complemental latch members of the assembly of FIG. 5A and showing the latch member of the platform section being moved to an unlatched condition by a release member mounted on the frame section.
FIG. 6A is similar to FIG. 6 showing a second modified pair of latch members.
FIG. 7 is similar to FIG. 6 but showing a third modified pair of latch members.

As seen in FIG. 1, the lip section 15 is manually raised from its dependent inoperative mode position to an extended substantially coplanar intermediate mode position II with respect to the platform section by a dock operator manipulating an elongated lifting hook 16 while standing on the loading surface L of the dock. The lower end 16a of the lifting hook is offset so as to be inserted through an opening 15b formed in the lip section near the free edge 15c thereof. A balancing spring 17 is mounted on the exposed surface of frame section 12 and is connected by a pair of pivotally connected levers 18 to the non-traffic surface N of the lip section 15 adjacent the edge 15a thereof. The force of spring 17 reduces significantly the amount of manual effort required to raise the platform and lip sections to the intermediate substantially vertical position as shown in FIGS. 4A and 5. Once the platform and lip sections assume the intermediate position II they are retained in a substantially coplanar relation by a latch mechanism the construction of which may vary as will be described more fully hereinafter.

Figure 4B:
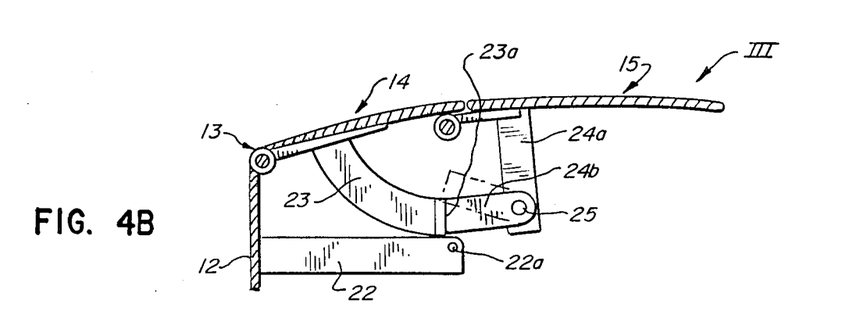
Figure 5A:
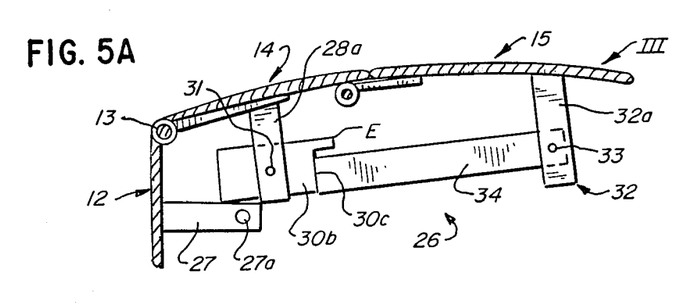

After the platform and lip sections are latched in the substantially coplanar relation and have assumed the intermediate position, the dock operator causes the latched sections to pivot downwardly as a unit about hinge 13 until the underside (non-traffic surface) of the lip section comes to rest upon the exposed surface of the vehicle bed B at which time the unit is in the operative mode position III, see FIGS. 4B and 5A. When in such a mode, the platform and lip sections coact to form a continuous traffic surface between the dock loading surface and the vehicle bed, thereby enabling forklift trucks and the like and personnel to readily move between the loading surface L and the vehicle bed B.

Figure 2:
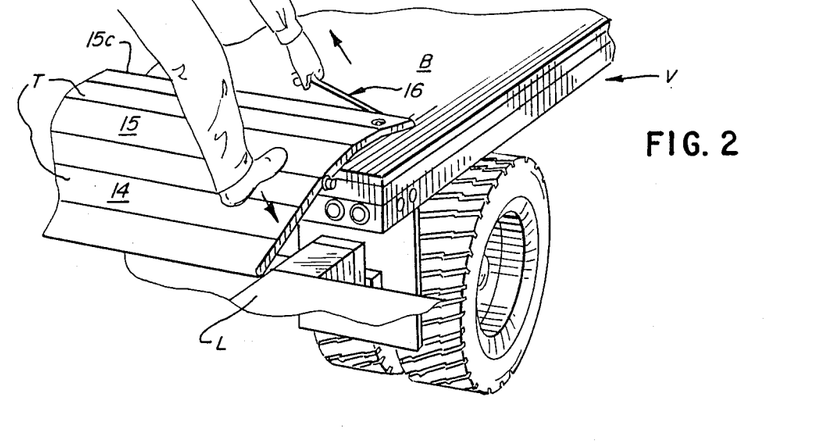
FIG. 2 is a fragmentary perspective view of the assembly of FIG. 1 showing the lip section thereof just prior to engaging the bed of a parked vehicle.

Pivotal movement of the sections as a unit may be accomplished by the dock operator pushing on the traffic surface of the platform section with one foot and at the same time controlling the downward movement with the lift hook 16, see FIG. 2. The spring 17 prevents the platform and lip sections from rapidly free-falling.

The platform and lip sections will remain in latched relation while moving from the intermediate position II towards the operative mode position III, the latter being where the lip section 15 is resting upon the vehicle bed. When the lip section 15 engages the vehicle bed B, the latch mechanism will become unlatched, as will be described more fully hereinafter.

Once the vehicle has moved away from the dock and the lip section has become disengaged from the vehicle bed, the lip section 15, which has previously been unlatched upon initial contact with the vehicle bed B, will immediately pivot downwardly relative to the platform section 14 about the hinged edge 15a as the platform section begins to pivot downwardly about hinge 13 until the underside of the platform section engages stops 20 fixedly mounted on the exposed surface of frame section 12, see FIG. 1. When the platform section is engaging the stops 20, the traffic surface T thereof is substantially coplanar with the dock loading surface L.

Where, however, the platform and lip sections are in a latched relation and no vehicle is present, the latched sections will pivot downwardly as a unit until automatic unlatching occurs as will be described hereinafter. When the unit 10 is in the inoperative position I, the platform section will assume a substantially horizontal position and the lip section a depending substantially vertical position. While the lip section is in such a position, it is not only recessed from and out of the way of the rear end of the vehicle bed, but also conceals the spring 17 as well as the various components of the latch mechanism to be described and protects them from adverse climatic conditions and vandalism.

One embodiment of the improved latch mechanism 21 is shown in FIGS. 4, 4A and 4B and includes a release member 22 which is fixedly mounted on and projects outwardly from the exposed face of frame section 12. Provided on the distal end of member 12 is a lateral protuberance or roller 22a. The function of the protuberance will become obvious from the discussion to follow.

Fixedly mounted on the non-traffic surface N of the platform section 14 is a first latch member 23 which projects outwardly a predetermined amount from said surface N. The outer end of latch member 23 is provided with an abutment surface 23a which is preferably disposed perpendicular to surface N of the platform section. As noted in FIGS. 4A and 4B, the abutment surface 23a is spaced outwardly a substantial distance from surface N.

Fixedly mounted on and projecting outwardly from the non-traffic surface N of the lip section 15 is a second latch member 24 which includes a bracket 24a and an elongated latch lever 24b. One end of the lever is pivotally connected at 25 to the outer end portion of the bracket 24a. The opposite or distal end of the lever 24b is substantially flat and is adapted to abuttingly engage the flat abutment surface 23a of the first latch member 23. Because of the weight of the lip section 15 and the movement of the platform and lip sections from the intermediate mode position II, FIG. 4A to the operative mode position III, FIG. 4B there is a substantial force exerted on the latch lever end to remain in abutting engagement with the surface 23a of the first latch member 23 until the lip section engages the vehicle bed B, or the latch lever 24b strikes the protuberance 22a of the release member 22 as the platform and lip sections continue their unitary downward pivotal movement. Once latch lever 24b is engaged by protuberance 22a, it will be automatically moved by the protuberance 22a out of engagement with the surface 23a of the latch member 23, as seen in phantom lines in FIG. 4B, causing the lever 24b to slide over the surface 23a thereby allowing the lip section to assume a dependent right angle position with respect to the platform section 14, see FIG. 4.

FIGS. 5, 5A show a modified latch mechanism 26 which may be substituted for latch mechanism 21, previously described. Mechanism 26 includes a release member 27 which is fixedly mounted on and projects outwardly from the exposed vertical surface of the frame section 12. The distal end of the release member 27 is provided with a lateral protuberance or roller 27a.

Fixedly mounted on the non-traffic surface N of the platform section 14 is a first latch member 28 which includes an outwardly projecting bracket 28a and a first latch lever 30; the latter being pivotally connected at 31 to the outer or distal end of the bracket. End portions 30a and 30b of lever 30 project in opposite directions from the pivotal connection 31. End portion 30a is adapted to be engaged by the release member protuberance 27a when the platform and lip sections 14 and 15 are to be unlatched as will be described more fully hereinafter. The other end portion 30b of lever 30 may be provided with a longitudinally extending finger-like extension E which is offset to one side of the end face 30c of the end portion 30b, see FIGS. 5, 5A and 6.

A second latch member 32 is mounted on the non-traffic surface N of lip section 15 and includes a fixedly mounted outwardly projecting bracket 32a. Pivotally connected at 33 to the distal end portion of the bracket 32a is a second latch lever 34. One end portion 34a of the lever is adapted to abut the end face 30c of the first latch lever 30 when the platform and lip sections are in latched relation. As seen in FIG. 5A, when levers 30 and 34 are in abutting relation, extension E will overlie the adjacent end portion of lever 34 and be disposed between the non-traffic surface N of the platform section and the end portion 34a of lever 34. Thus, when the end portion 30a of lever 30 engages protuberance 27a, see FIG. 6, lever 30 will pivot in a clockwise direction about connection 31 and simultaneously therewith the extension E will bear against the lever end portion 34a and assist in causing the lever 34 to pivot in a counterclockwise direction about connection 33 and thus, effect disengagement of the latch levers from one another and unlatching of the platform and lip sections. In some instances, see FIG. 6A, the extension E may be omitted, in which case the frictional engagement between the abutting surfaces of levers 30 and 34 is relied upon to transmit a pivoting unlatching force from lever 30 to lever 34, when lever 30 contacts protuberance 27a.

FIG. 7 discloses a slightly modified latch mechanism wherein a longitudinally extending finger-like extension EE is provided on the second latch lever 134 rather than on the first latch lever 130 as in the assembly 26, see FIG. 6. When the levers 130 and 134 are in abutting engagement and the platform and lip sections are in latched relation, extension EE will engage and subtend the end portion 130b of lever 130. Thus, upon the opposite end 130a of lever 130 engaging the release member protuberance 27a, the lever will pivot in a clockwise direction about connection 131 causing the lever end portion 130b to bear against extension EE and rotate lever 134 in a counterclockwise direction about connection 133 to an unlatched position.

In either mechanism 26 or 126, once the second latch lever 34 or 134 has disengaged the end portion of lever 30 or 130, the second latch lever 34 or 134 will continue to rotate in a counterclockwise direction due to the force of gravity and assume a substantially parallel relation with the non-traffic surface N of the depending lip section 15, when the latter is in the inoperative mode position I.

Figures 8, 9, 9A, 9B:
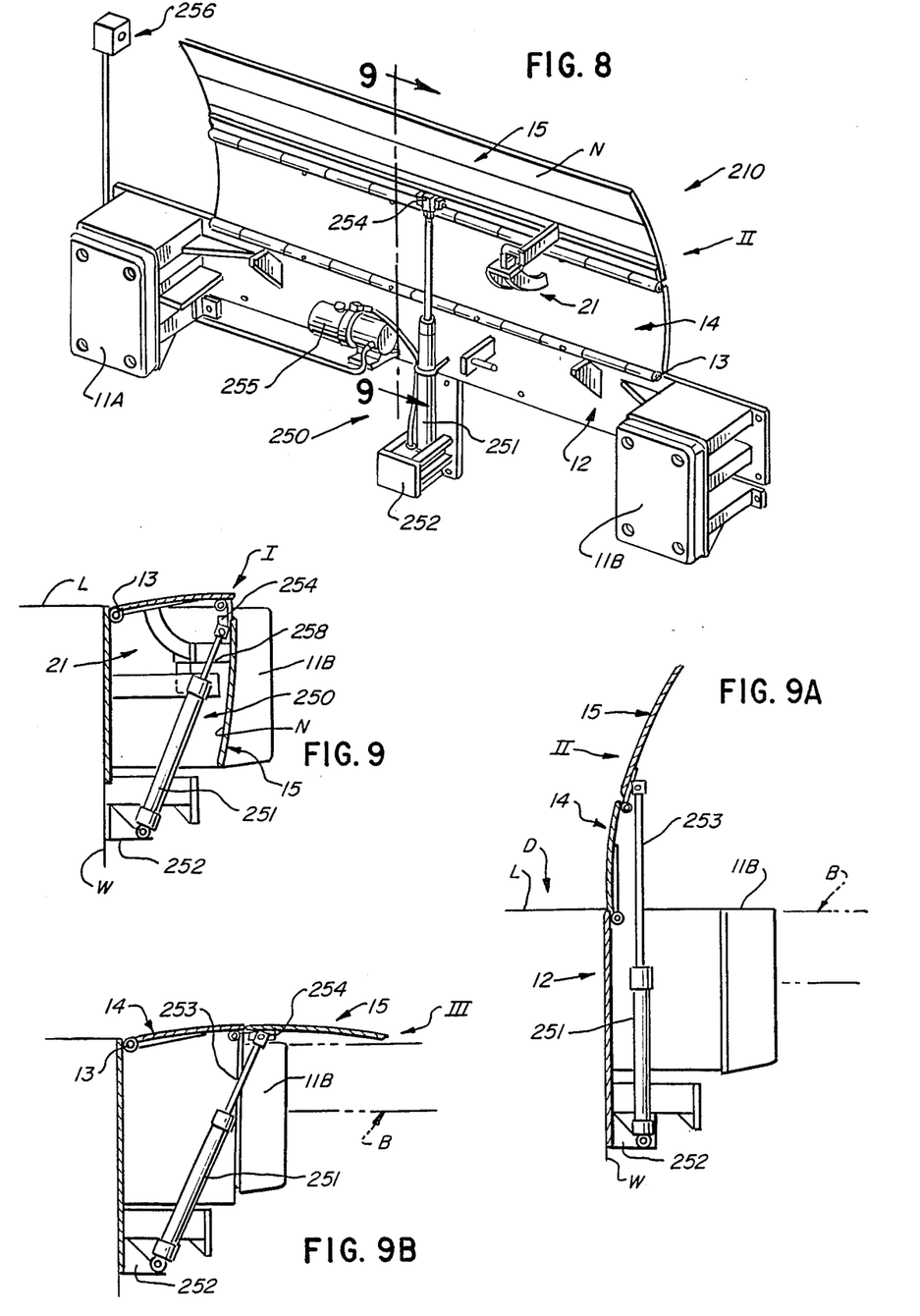
FIG. 8 is similar to FIG. 1 but showing a hydraulic version of an improved edge of dock leveler assembly.
FIGS. 9, 9A and 9B are fragmentary sectional views taken along line 9—9 of FIG. 8 but showing, respectively, the lip and platform sections thereof in inoperative, intermediate and operative positions.

FIGS. 8 through 9B disclose a hydraulic edge of dock leveler unit 210 which is basically the same as unit 10 except that the balance spring 18 of unit 10 has been replaced by a hydraulic piston-cylinder assembly 250. The assembly includes a cylinder 251 which is pivotally connected at its lower end to a bracket 252, the latter being fixedly mounted on a lower portion of the dock upright front wall W. The exposed end of the piston 253 is pivotally connected to a bracket 254 fixedly mounted on the non-traffic surface of the lip section 15. Hydraulic pressure for the cylinder 251 is supplied by a pump 255 which is mounted on the exposed surface of the frame section 12. A push-button control 256 for the pump may be mounted on the dock in the vicinity of the unit 210. The control 256 may be a conventional type wherein the piston 253 will be extended only when the button thereof is held in a depressed state. Once the button is released the piston will begin to retract. A suitable key-actuated switch not shown, may be incorporated with the push-button control to prevent unauthorized operation of the assembly 250. Other types of controls may be utilized, if desired, to operate the assembly 250.

Once the piston 253 has been extended so as to cause the platform and lip sections to assume a substantially coplanar upright intermediate position II, as shown in FIGS. 8 and 9A, the sections, depending upon which latch mechanism 21 or 26 is incorporated in the unit 210, will be latched in the substantially coplanar relation by the coaction of the components of the latch assembly 21 or 26 as previously described. As the extended piston 253 begins to retract into cylinder 251, the latched sections will pivot as a unit about hinge 13 until the lip section engages the bed of the parked vehicle. Unlatching of the platform and lip sections occurs in a manner as previously described with regard to assemblies 21 and 26.

As noted in FIG. 8, the various components comprising the latch mechanism 21 or 26 are mounted on the unit 210 so as not to interfere with the location and operation of the various components comprising the hydraulic system. When unit 210 is in the inoperative mode position I, see FIG. 9, the dependent lip section 15 conceals the latch assembly components as well as the components, except for the push-button control 256, of the hydraulic system. FIGS. 9A and 9B show the relative positions of the platform and lip sections when in the intermediate and operative positions II,III. The latch mechanism 21 shown in FIG. 9 has been omitted in FIGS. 9A, 9B so that the changes in relative positions of the various components of the hydraulic system can be seen more clearly.

While the invention has heretofore been described in relation to an edge of dock leveler unit, it is not intended to be limited thereto, but may be utilized with other types of dock levelers.

Thus, an improved dock leveler unit has been disclosed which incorporates a novel latch mechanism of simple, yet sturdy, construction and which effectively overcomes the serious problem of the lip section accidentally or inadvertently remaining in an extended position, once a vehicle has moved away from the loading dock or if the unit is actuated without a vehicle being present. The improved latch mechanism does not rely on human alertness to cause the lip section to move from an operative mode position to an inoperative mode position. The latch mechanism is easy to install on dock leveler units already in place on a loading dock. The latch mechanism may be readily incorporated in a variety of types and styles of edge of dock leveler units.

I claim:

1. A dock leveler assembly mounted for adjustment between operative and inoperative mode positions; when in an operative mode position, said assembly being adapted to engage a bed of a vehicle while the latter is in a parked location adjacent a front wall of a dock, and when in an inoperative mode position, said assembly being adapted to be disengaged from the vehicle bed and out of a path of travel of the vehicle when the latter is moving to the parked location adjacent the dock front wall; said assembly comprising a fixedly mounted frame section adjacent the dock front wall whereby an upper edge of said frame section is disposed adjacent a dock loading surface, said frame section including a fixedly mounted release means extending outwardly therefrom; a platform section having a first edge hingedly connected to the frame section upper edge, said platform section having a traffic surface, a non-traffic surface, and a first latch means mounted on and extending from said non-traffic surface; and a lip section hingedly connected to a second edge of the platform section opposite said first edge, said lip section having a traffic surface, a non-traffic surface, and a complemental second latch means mounted on and extending from the non-traffic surface thereof, said first and second latch means being adapted to engage one another and latch said lip section in a fixed position of hinged adjustment with respect to said platform section whereby said platform and lip sections pivot as a unit in one direction about the frame section upper edge through a given sector to an operative mode position wherein the lip section is adapted to engage the bed of the parked vehicle and become unlatched from the platform section whereupon as the vehicle moves away from the parked location, said platform and lip, sections automatically assume said inoperative mode position; if no vehicle is present at the parked location when said platform and lip sections pivoted as a unit in said one direction beyond the given sector one of the latch means engages the release means effecting disengagement of the first and second latch means and automatic unlatching of the platform and lip sections whereupon the assembly assumes said inoperative mode position.

2. The dock leveler assembly of claim 1 wherein the second latch means includes a first bracket fixedly mounted on the lip section non-traffic surface and a first latch lever pivotally connected to said bracket and having a projecting end in latched engagement with the first latch means while said platform and lip sections pivot as a unit through said given sector.

3. The dock leveler assembly of claim 2 wherein the projecting end of the first latch lever is in abutting engagement with the first latch means when said platform and lip sections are in latched relation.

4. The dock leveler assembly of claim 2 wherein the first latch lever is engaged by the release means and effects unlatching of the platform and lip sections.

5. The dock leveler assembly of claim 4 wherein the first latch means includes a protuberance fixedly mounted on the platform section non-traffic surface, said protuberance being adapted to be engaged by the first latch lever projecting end of the second latch means.

6. The dock leveler assembly of claim 3 wherein the first latch means includes a second bracket fixedly mounted on said platform section non-traffic surface and projecting therefrom, and an elongated second latch lever pivotally mounted on said second bracket and having first and second end portions projecting in opposite directions from said second bracket; one of said end portions being adapted to abuttingly engage the first latch lever projecting end when said platform and lip sections are in latched relation, the other end portion of said second latch lever being adapted to be engaged and moved by said release means to effect unlatching of said platform and lip sections.

7. The dock leveler assembly of claim 1 wherein, when the unit is in an operative mode position, the traffic surfaces of said platform and lip sections coact to form a substantially continuous exposed traffic surface between the dock loading surface and the bed of the vehicle at the parked location.

8. The dock leveler assembly of claim 6 wherein an abutting end of one of the latch levers is provided with an extension which engages an exterior surface portion of the other latch lever, when said platform and lip sections are in latched relation, and effects transmittal of the pivotal movement of the second latch lever to effect disengagement of said levers and unlatching of the platform and lip sections, when the second latch lever is engaged and moved by the release means.

9. The dock leveler assembly of claim 1 wherein the frame section includes means operatively connected to the lip section for controlling movement of the lip section from an unlatched relation to a latched relation with respect to the platform section.

10. The dock leveler assembly of claim 8 wherein the extension is provided on the latch lever of the first latch means and said extension is adapted to overlie an exterior segment of the latch lever of the second latch means when the platform and lip sections are in latched relation.

11. The dock leveler assembly of claim 8 wherein the extension is provided on the latch lever of the second latch means and said extension is adapted to subtend and engage an end portion of the latch lever of first latch means when the platform and lip sections are in latched relation.

12. A latch mechanism for use in a dock leveler assembly wherein the latter is provided with a fixedly mounted frame section disposed adjacent a dock front wall and having an edge of the frame section adjacent a loading surface of the dock, a platform section hingedly connected to the frame section edge, and a lip section hingedly connected to the platform section and disposed opposite the frame section, the platform and lip sections being adjustable between inoperative and operative mode positions, said latch mechanism comprising a release means adapted to be fixedly mounted on the frame section and project outwardly therefrom; a first latch means adapted to be mounted on the platform section and projecting therefrom; and a second latch means adapted to be mounted on the lip section and projecting therefrom, said first and second latch means being adapted to abuttingly engage one another and retain the lip section in a predetermined latched position of hinged adjustment relative to the platform section whereby the platform and lip sections are adapted to pivot as a unit in one direction relative to the frame section through a predetermined sector to an operative mode position; said release means being adapted to be engaged by one of the latch means, upon the latched platform and lip sections pivoting in the one direction beyond the predetermined sector, and automatically effecting disengagement of the abutting latch means and unlatching of the platform and lip sections whereupon the latter assume an inoperative mode position.

13. The latch mechanism of claim 12 wherein the second latch means includes a first bracket for fixedly mounting on a non-traffic surface of the lip section, and a first latch lever pivotally mounted on said bracket, one end of the latch lever being adapted to abuttingly engage the first latch means and effect latching of the platform and lip sections.

14. The latch mechanism of claim 13 wherein the first latch means includes a second bracket for fixedly mounting on a non-traffic surface of the platform section, and a second latch lever pivotally mounted on said second bracket, said second latch lever having an end in abutting engagement with the one end of the first latch lever when the platform and lip sections are in latched relation.

15. The latch mechanism of claim 13 wherein the first latch lever engages the release means to effect disengagement of the first latch lever from the first latch means and unlatching of the platform and lip sections.

16. The latch mechanism of claim 14 wherein a portion of the second latch lever disposed on the side of the pivotal axis thereof opposite the end in abutting engagement with the first latch lever is adapted to be engaged by the release means and effect disengagement of the first and second latch levers and unlatching of the platform and lip sections.

17. The latch mechanism of claim 16 wherein the abutting end of one of the latch levers is provided with an extension which engages an exterior surface portion of the other latch lever in proximity to the abutting end thereof and effects transmittal of the pivotal movement of the second latch lever to the first latch lever effecting disengagement of said levers, when the second latch lever engages and is moved by the release means.

* * * * *

UNITED STATES PATENT AND TRADEMARK OFFICE
CERTIFICATE OF CORRECTION

PATENT NO. : 4,865,507

DATED : September 12, 1989

INVENTOR(S) : Glen Trickle

It is certified that error appears in the above-identified patent and that said Letters Patent is hereby corrected as shown below:

In column 5, line 10, "engagment" should read --engagement--.

In column 7, line 51, claim 1, "lip, sections" should read --lip sections--.

Signed and Sealed this

Twenty-fourth Day of July, 1990

Attest:

HARRY F. MANBECK, JR.

Attesting Officer

Commissioner of Patents and Trademarks